United States Patent
Iimura et al.

(10) Patent No.: US 7,291,312 B2
(45) Date of Patent: Nov. 6, 2007

(54) OZONE REMOVING MATERIAL AND METHOD FOR PREPARING THE SAME

(75) Inventors: Seiji Iimura, Kanagawa (JP); Kazuyoshi Takeda, Kanagawa (JP); Kunio Fujiwara, Kanagawa (JP); Mari Katsumine, Kanagawa (JP)

(73) Assignee: Ebara Corporation, Tokyo (JP)

( * ) Notice: Subject to any disclaimer, the term of this patent is extended or adjusted under 35 U.S.C. 154(b) by 620 days.

(21) Appl. No.: 10/333,337

(22) PCT Filed: Jul. 17, 2001

(86) PCT No.: PCT/JP01/06174

§ 371 (c)(1),
(2), (4) Date: Jan. 21, 2003

(87) PCT Pub. No.: WO02/05960

PCT Pub. Date: Jan. 24, 2002

(65) Prior Publication Data

US 2004/0028575 A1    Feb. 12, 2004

(30) Foreign Application Priority Data

Jul. 19, 2000  (JP) .............................. 2000-218810

(51) Int. Cl.
*B01J 41/12* (2006.01)
*D04H 1/00* (2006.01)
*B01D 50/00* (2006.01)

(52) U.S. Cl. .................... 422/171; 521/30; 442/414

(58) Field of Classification Search ............... 422/171; 428/235; 521/30, 149; 442/414
See application file for complete search history.

(56) References Cited

U.S. PATENT DOCUMENTS 4,036,588 A  *  7/1977  Williams et al. ............. 8/130.1

(Continued)

FOREIGN PATENT DOCUMENTS

| EP | 0 816 294 A2 | 1/1998 |
|---|---|---|
| EP | 0 931 581 A1 | 7/1999 |
| JP | 63-93327 | 4/1988 |
| JP | 3-109947 | 5/1991 |
| JP | 6-39379 | 2/1994 |
| JP | 8-89811 | 4/1996 |
| JP | 11-47616 | 2/1999 |

OTHER PUBLICATIONS

B. Dhandapani et al.: "Gas phase ozone decomposition catalysts" Applied Catalysis B; Environmental 11, pp. 129-166 1997.

(Continued)

*Primary Examiner*—Glenn Caldarola
*Assistant Examiner*—Tom Duong
(74) *Attorney, Agent, or Firm*—Oblon, Spivak, McClelland, Maier & Neustadt, P.C.

(57) ABSTRACT

An object of the present invention is to solve problems of conventional ozone-scavenging materials and to provide an ozone-scavenging material capable of effectively decomposing/removing ozone at low cost. To attain the above object, the present invention provides an ozone-scavenging material characterized in that a metal having ozone-decomposing ability or an oxide thereof is supported on an organic polymer base having a polymer side chain having an ion exchange group on the backbone of a polymer. Said ozone-scavenging material can be prepared by introducing a polymer side chain having an ion exchange group onto the backbone of an organic polymer base, bringing the resulting organic polymer material into contact with a salt of a metal having ozone-decomposing ability to support the ion of said metal on the ion exchange group, and then precipitating fine particles of said metal or an oxide of said metal on the organic polymer material by oxidation or reduction.

17 Claims, 4 Drawing Sheets

U.S. PATENT DOCUMENTS

| | | | |
|---|---|---|---|
| 4,207,291 | A | 6/1980 | Byrd et al. |
| 4,340,057 | A * | 7/1982 | Bloch et al. ............. 604/358 |
| 4,810,567 | A * | 3/1989 | Calcaterra et al. ........ 442/123 |
| 5,648,400 | A * | 7/1997 | Sugo et al. ................ 521/30 |
| 5,863,654 | A * | 1/1999 | Frey et al. ................. 428/375 |
| 6,020,278 | A * | 2/2000 | Gatenholm ............... 442/414 |
| 6,277,408 | B1 * | 8/2001 | Wellinghoff et al. ....... 424/473 |
| 6,703,432 | B1 * | 3/2004 | Fujiwara et al. ........... 521/149 |
| 6,811,771 | B1 * | 11/2004 | Sugo et al. ............. 424/78.17 |

OTHER PUBLICATIONS

C. Heisig et al.: "Decomposition of ozone using carbon-supported metal oxide catalysts" Applied Catalysis B; Environmental 14, pp. 117-129 1997.

Derwent Publication, AN 1981-09102D, XP-002309627, SU 738 643, Jun. 8, 1980.

* cited by examiner

OZONE REMOVING MATERIAL AND METHOD FOR PREPARING THE SAME

TECHNICAL FIELD

The present invention relates to ozone-scavenging materials capable of removing ozone in gases and processes for preparing them.

BACKGROUND ART

Ozone is widely used for treating drinking and sewage waters, germicidal treatment of facilities/equipments in food factories and the like, household disinfection, etc., because of its strong oxidative power. It is also used for forming oxide films of wafers in semiconductor industry. However, ozone induces health problems such as headache, vomition and pulmonary edema by its strong oxidative power, so that spent ozone after use should be decomposed and detoxified. Conventional methods for decomposing such ozone involved contacting exhaust gas containing ozone with activated carbon or a metal having ozone-decomposing ability supported on zeolite or the like.

However, activated carbon is often used at intentionally lowered decomposition speed by granulation with other components to prevent the danger of explosion when it is used for decomposition/detoxification of ozone contained at high concentrations in exhaust gas. On the other hand, granular activated carbon is insufficient in removal performance when ozone is contained at low concentrations in exhaust gas.

An alternative means using activated carbon fiber was proposed. Activated carbon fiber is effective even for decomposition/removal of low concentrations of ozone because of its large surface area and high decomposition speed. It also has the advantage that it can be easily formed into a shape of a filter or the like. However, ozone-scavenging materials based on activated carbon fiber have problems such as high cost and dust.

DISCLOSURE OF THE INVENTION

An object of the present invention is to solve the above problems of conventional ozone-scavenging materials and to provide an ozone-scavenging material capable of effectively decomposing/removing ozone at low cost. It is also preferable to rapidly remove minor amounts of ozone generated in copying machines or semiconductor manufacturing apparatus using UV (e.g. exposure apparatus for curing photocurable resist). Especially in semiconductor production, ozone should be removed from the atmosphere as possible as completely because the presence of ozone seems to adversely affect the yield of semiconductor devices. Thus, another object of the present invention is to provide an ozone-scavenging material and an ozone-scavenging apparatus that can be fitted in such copying machines or semiconductor manufacturing apparatus to remove ozone generated therein.

To attain these objects, the present invention provides an ozone-scavenging material characterized in that a metal having ozone-decomposing ability or an oxide thereof is supported on an organic polymer base having a polymer side chain having an ion exchange group on the backbone of a polymer.

THE MOST PREFERRED EMBODIMENTS OF THE INVENTION

Figure 1:
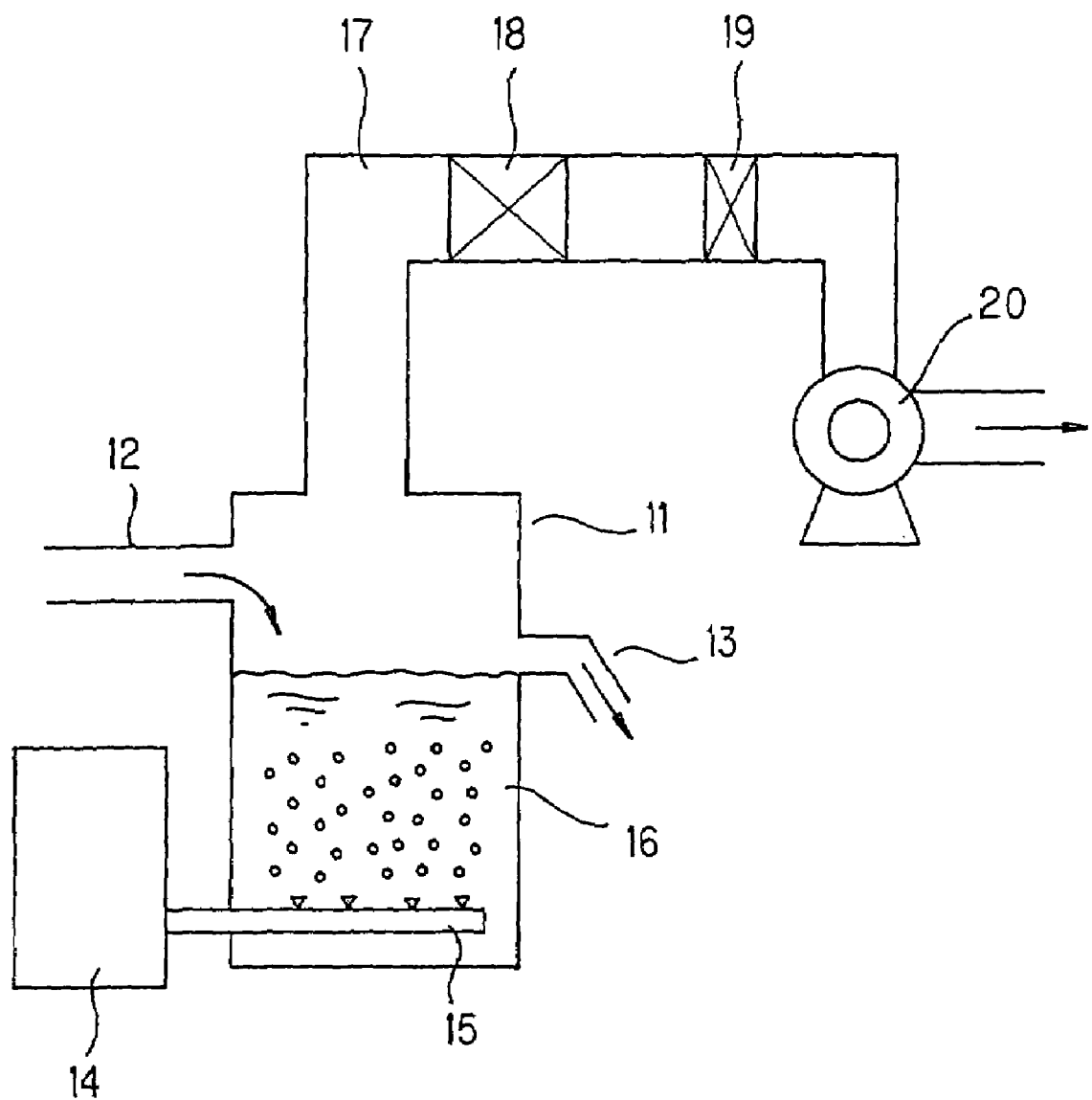
FIG. 1 is a schematic view showing an example in which an ozone-scavenging material of the present invention is fitted in an exhaust system of an ozone absorption tower for wastewater treatment.

Various specific aspects of the present invention are explained in detail below.

Organic polymer bases used as base materials for ozone-scavenging materials of the present invention are preferably polyolefin-based organic polymer materials. Polyolefin-based organic polymer materials are suitable for the purpose of introducing a graft side chain by radiation-induced graft polymerization described below because they are not degradable by radiations. These organic polymer bases are preferably used in the form of fibers or woven or nonwoven fabrics consisting of a fiber assembly or processed products thereof such as sponge-like materials. These materials are used for air filters or the like because they have a large surface area and their pore diameter can be easily controlled or they can be easily formed into a pleated shape. Therefore, these bases can be used to provide an ozone-scavenging material in the form of a filter that can not only decompose/remove ozone in exhaust gas but also remove fine particles in exhaust gas. Filters prepared from woven/nonwoven fabrics can be easily handled after use and readily incinerated, in contrast to conventional activated carbon or zeolite filters that were hard to incinerate.

In the present invention, suitable means for introducing a side chain in the form of a polymer chain having an ion exchange group onto the polymer backbone of an organic polymer base as described above include graft polymerization. Especially, radiation-induced graft polymerization is the most preferred method for the purpose of the present invention, because a desired graft polymer side chain can be introduced into a polymer base by irradiating the base to produce a radical and reacting it with a graft monomer and the number or length of graft chains can be relatively freely controlled and polymer side chains can be introduced into existing polymer materials in various shapes.

Radiations that can be used in radiation-induced graft polymerization well suitable for the purpose of the present invention include α-rays, β-rays, γ-rays, electron rays, UV ray, etc., among which γ-rays and electron rays are preferred for use in the present invention. Radiation-induced graft polymerization includes preirradiation graft polymerization involving preliminarily irradiating a graft base and then bringing it into contact with a polymerizable monomer (graft monomer) for reaction, and simultaneous irradiation graft polymerization involving simultaneously irradiating a base and a monomer, and either method can be used in the present invention. Radiation-induced graft polymerization is classified by the manner of contact between a monomer and a base into liquid phase graft polymerization performed with a base immersed in a monomer solution, gas phase graft polymerization performed with a base in contact with the vapor of a monomer, immersion gas phase graft polymerization performed by immersing a base in a monomer solution and then removing it from the monomer solution for reaction in a gas phase, etc., and any of these methods can be used in the present invention.

Fibers and woven/nonwoven fabrics consisting of a fiber assembly are the most preferred materials for use as bases for ozone-scavenging materials of the present invention, and are also suitable for use in immersion gas phase graft polymerization because they tend to retain monomer solutions.

When radiation-induced graft polymerization is used to introduce a polymer side chain, large amounts of metals can be supported in an organic polymer base because a graft side chain can be introduced not only onto the surface of the base in a complex shape such as a woven/nonwoven fabric but also inside it.

Ion exchange groups to be introduced in the form of a polymer side chain into an organic polymer base in the present invention include cation exchange groups and anion exchange groups. They are dissociated into negative and positive functional groups, respectively, so that any ion exchange groups of the same type present in a graft chain repel each other to swell the graft chain. Thus, ion exchange groups are dispersed in the base, and therefore, metals to be supported on the ion exchange groups are also dispersed in the base. Cation exchange groups such as sulfonate or carboxyl adsorb well metal ions such as manganese chloride, manganese nitrate, zinc chloride, zinc nitrate and nickel nitrate. On the other hand, anion exchange groups such as quaternary ammonium or lower amino groups adsorb anions such as permanganate ion. In the present invention, any of ion exchange groups can be used. In the present invention, it is a matter of course that amphoteric ion exchangers such as amino acids can also be used as ion exchange groups to be introduced in the form of a polymer side chain into a base.

In the present invention, a polymer side chain having an ion exchange group can be introduced onto the backbone of a polymer base by introducing a polymerizable monomer having said ion exchange group onto the backbone of the polymer base by graft polymerization or introducing a polymerizable monomer not having an ion exchange group itself but having a group capable of being converted into an ion exchange group onto the backbone of the polymer base by graft polymerization and then converting said group into the ion exchange group by further reaction to introduce the ion exchange group onto the polymer side chain.

Specific examples of polymerizable monomers having an ion exchange group that can be used for this purpose include polymerizable monomers having a sulfonate group as a cation exchange group such as sodium styrenesulfonate, sodium vinylsulfonate and sodium methallylsulfonate; polymerizable monomers having a carboxyl group such as acrylic acid and methacrylic acid; and polymerizable monomers having a tertiary amino group such as diethylaminoethyl methacrylate; and these monomers can be graft-polymerized onto the backbone of an organic polymer base to introduce a polymer side chain having an ion exchange group into the base. Other examples of polymerizable monomers having an ion exchange group include sodium allylsulfonate, vinylbenzyltrimethylammonium chloride, etc.

Polymerizable monomers not having an ion exchange group themselves but having a group capable of being converted into an ion exchange group include glycidyl methacrylate, styrene, acrylonitrile, acrolein, chloromethylstyrene, etc. For example, glycidyl methacrylate can be introduced as a polymer side chain onto a polymer base by graft polymerization and then sulfonated by reaction with sodium sulfite for conversion into a cation exchange group or aminated by reaction with iminodiethanol for conversion into an anion exchange group. However, polymerizable monomers that can be used in the present invention are not limited to the list mentioned above.

In order to prepare an ozone-scavenging material of the present invention, a metal ion having ozone-decomposing ability is then supported on the ion exchange group existing on the polymer side chain placed on the backbone of a polymer base obtained by the method described above.

Metals having ozone-decomposing ability that can be used in the present invention include manganese, zinc, silver, nickel, cobalt or copper. Especially, manganese is preferable for use in the present invention because of excellent ozone-scavenging performance and limited performance degradation.

In ozone-scavenging materials of the present invention, the amount of the metal having ozone-decomposing ability to be supported can be readily controlled because the metal is supported on a base by ion exchanging reaction and thereby introduced into the base.

In the present invention, a metal ion having ozone-decomposing ability can be supported on an ion exchange group introduced in the form of a polymer side chain into a polymer base as follows. When the ion exchange group is a cation exchange group, a metal such as manganese, zinc, silver, nickel, cobalt or copper can be supported on the ion exchange group by bringing a hydrochloride or nitrate of said metal into contact with a polymer base in which the ion exchange group has been introduced in the form of a polymer side chain. If the ion exchange group introduced is sulfonate, for example, a metal can be supported by bringing an acid-type or alkali metal salt-type sulfonate group into contact with an aqueous solution of said metal salt. If the ion exchange group is a carboxyl group, it should be used in the form of an alkali metal salt-type in order to support a sufficient amount of metal. When the ion exchange group is an anion exchange group, permanganate ion can be supported by bringing the anion exchange group into contact with an aqueous potassium permanganate solution, for example.

An ozone-scavenging material of the present invention can be thus formed. This ozone-scavenging material can reduce environmental pollution such as metal outflow because metals are stably bound to the base via ion bond and less likely to be separated.

Metal ions supported on an ion exchange group are preferebly converted into the form of a metal or metal oxide via redox in order to increase the catalytic ability of said metal ions. This can be performed by contacting a base having a metal ion supported on an ion exchange group with an oxidant such as oxygen (air), hydrogen peroxide, ozone or potassium permanganate to precipitate fine particles of the metal or metal oxide. When a strong oxidant such as permanganate ion is supported on an ion exchange group, it can be precipitated as fine particles of a metal or metal oxide using hydrogen peroxide or other reducing agents. A base having a metal ion supported on an ion exchange group can also be left in the air for spontaneous reduction.

When a metal having ozone-decomposing ability is precipitated in the form of fine particles of the metal or an oxide thereof in an ozone-scavenging material of the present invention as described above, an anion exchange group is preferably used as an ion exchange group. This is because fine particles of a metal or metal oxide have a negative static charge, which attracts the positive static charge of the anion exchange group so that the fine particles of the metal or metal oxide are firmly bound to the ozone-scavenging material and inhibited from separating from the scavenging material. This prevents environmental pollution caused by outflow of the metal itself.

Oxidants such as ozone oxidize and degrade organic polymer materials once they come into contact with them, but ozone-scavenging materials of the present invention can prevent ozone-induced degradation such as breakage of a graft chain because an ion exchange group has been introduced not only onto the surface of a fibrous base but also inside it by graft polymerization, and accordingly, even if the metal ion supported on the ion exchange group is precipitated in the form of fine particles of the metal or an oxide thereof, the fine particles of the metal not only exist on the surface of the base but also penetrate it. This is very useful for exposure to high concentrations of ozone such as waste ozone treatment.

Radiation-induced graft polymerization preferably used in the present invention is characterized in that the number or length of graft chains can be relatively freely controlled by changing the exposed dose or grafted degree. According to the present invention, this characteristic can be applied to disperse a metal having ozone-scavenging ability on the order of nano- to micrometers into a base, thereby increasing ozone-scavenging effect.

Next, various forms of ozone-scavenging materials of the present invention for actual use are described below. The following description relates to specific examples of application of the present invention without, however, limiting the invention thereto.

FIG. 1 shows an example in which an ozone-scavenging material of the present invention is fitted in an exhaust system of an ozone absorption tower for wastewater treatment. Wastewater such as sewage is introduced into ozone absorption tower 11 via inflow pipe 12. Ozone absorption tower 11 comprises ozone generator 14 and ozone diffuser tube 15 connected thereto, whereby ozone is injected into wastewater 16 in absorption tower 11 to sterilize the wastewater. Sterilized wastewater is discharged from the system via discharge pipe 13. On the other hand, exhaust gas from ozone absorption tower 11 should not be directly discharged into the atmosphere because it contains a high concentration of ozone. Thus, ozone-decomposing catalyst bed 18 such as activated carbon or a metal having ozone-decomposing ability supported on zeolite is fitted in discharge pipe 17 of ozone absorption tower 11 to catalytically decompose ozone in exhaust gas. However, ozone is often insufficiently decomposed by ozone-decomposing catalysts and low concentrations of ozone remain undecomposed, as described above. Thus, ozone-decomposing material 19 of the present invention can be placed downstream of ozone-decomposing catalyst bed 18 in discharge pipe 17. This allows ozone remaining in exhaust gas to be completely decomposed and exhaust gas to be detoxified. Exhaust gas with ozone decomposed is discharged into the atmosphere via suction fan 20.

Wastewater may also be sterilized by combining wastewater such as sewage with ozonized water prepared by supplying tap water or the like to ozone absorption tower 11 shown in FIG. 11. A beverage can also be supplied to ozone absorption tower 11 and sterilized with ozone. Alternatively, pure water can be supplied to ozone absorption tower 11 to absorb ozone and used as ozonized water for forming oxide films of wafers for semiconductors. In these cases, ozone in exhaust gases can also be decomposed with ozone-scavenging material 19 of the present invention fitted in exhaust gas discharge pipe 17 of ozone absorption tower.

Figure 2:
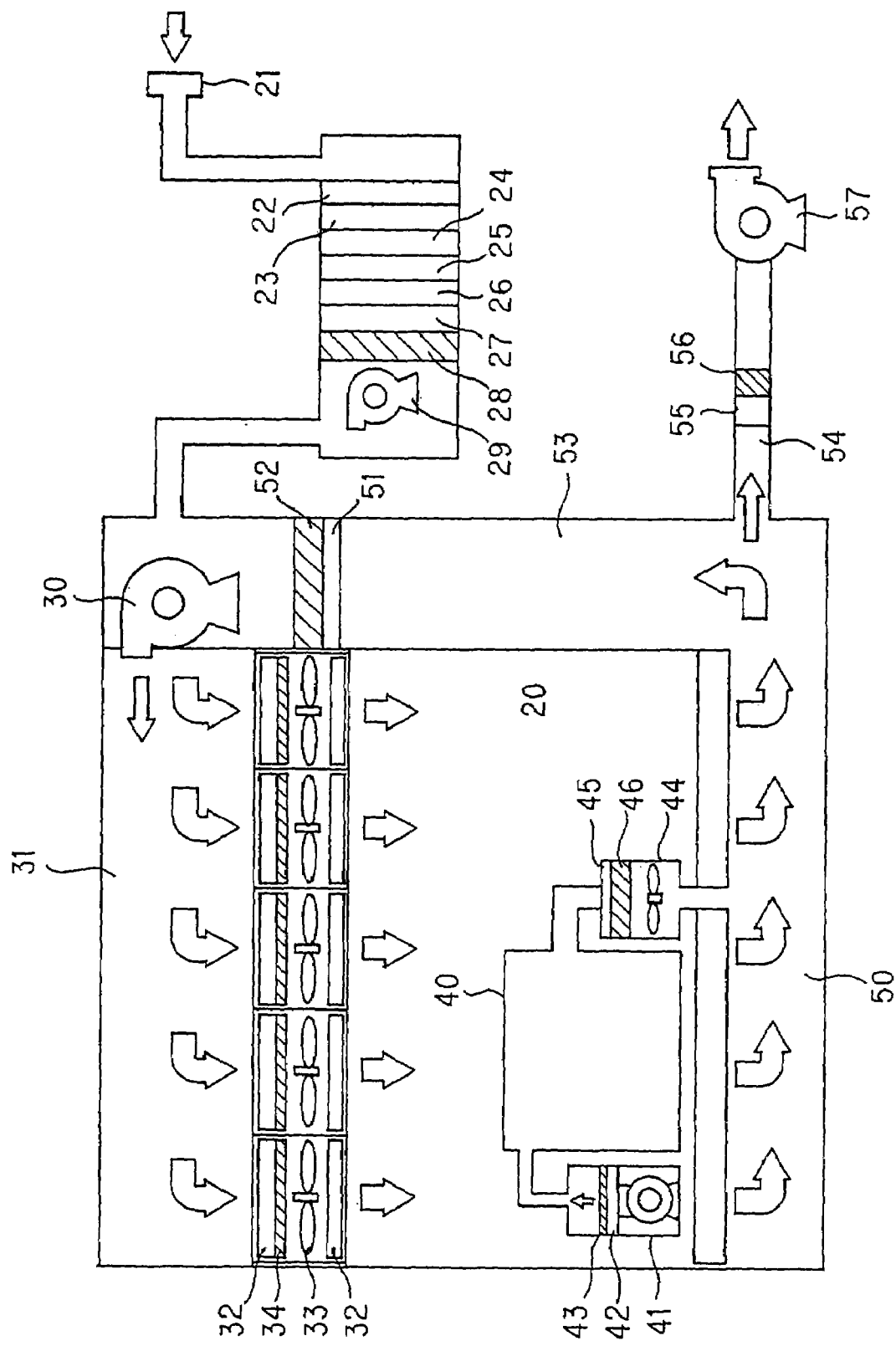
FIG. 2 is a schematic view showing an example in which an ozone-scavenging material of the present invention is fitted in a clean room for semiconductor production.

Next, an example in which an ozone-scavenging material of the present invention is fitted in a clean room for semiconductor production is described. It is preferable to remove ozone as completely as possible from the air in such a clean room, because if ozone is contained in the air in a clean room, it seems to have various adverse influences such as decreased yield of semiconductor devices such as wafers manufactured in the clean room. FIG. 2 shows an example of layout of a clean room for semiconductor production. To clean room 20 is connected outside air inlet 21 through which outside air is introduced into the clean room. In the outside air inlet line are provided, for example, prefilter 22, middle-performance filter 23, cooler 24, heater 25, humidifier 26 and high-performance filter 27 so that outside air can be purified enough for use in the clean room. Not only fine particles such as dust or harmful substances for semiconductor devices but also ozone can be removed from the outside air introduced into the clean room by fitting ozone-scavenging material 28 of the present invention in the purifier in this outside air inlet system. Purified outside air is introduced into ceiling duct space 31 of the clean room by fans 29, 30.

The air introduced into ceiling duct space 31 of the clean room is introduced into clean room 20 from the ceiling by a plurality of fan units 33 equipped with air purifying member 32 such as HEPA filter, ULPA filter or chemical filter. Ozone-scavenging material 34 of the present invention can be fitted in said fan units 33. Thus, ozone can be removed from the air introduced into the clean room.

A semiconductor manufacturing apparatus 40 forming a closed space may be placed in clean room 20. In this case, semiconductor manufacturing apparatus 40 is provided with air inlet unit 41 for introducing the air in clean room 20, and air inlet unit 41 is equipped with air purifying member 42 such as HEPA filter or ULPA filter. Ozone-scavenging material 43 of the present invention can be fitted in this air inlet unit for semiconductor manufacturing apparatus. The ozone-scavenging material can be fitted separately from the filter shown above or in combination with said filter to form a filter unit. Exhaust unit 44 for discharging exhaust gas can be provided in semiconductor manufacturing apparatus 40 and filter 45 can be fitted in exhaust unit 44. In this case, ozone-scavenging material 46 of the present invention can be fitted in the exhaust unit for semiconductor manufacturing apparatus. Thus, ozone generated in the semiconductor manufacturing apparatus can be removed.

The air in clean room 20 can be guided to underfloor duct space 50, and then introduced into ceiling duct space 31 again via circulating line 53. In this case, ozone-scavenging material 52 of the present invention can be fitted in circulating line 53 that may be equipped with air purifying member 51 such as a filter. The air guided into underfloor duct space 50 can also be partially discharged into the atmosphere by exhaust fan 57 via exhaust line 54. In this case, ozone-scavenging material 56 of the present invention can be fitted in exhaust line 54 that may be equipped with air purifying member 55 such as a filter.

Figure 3:
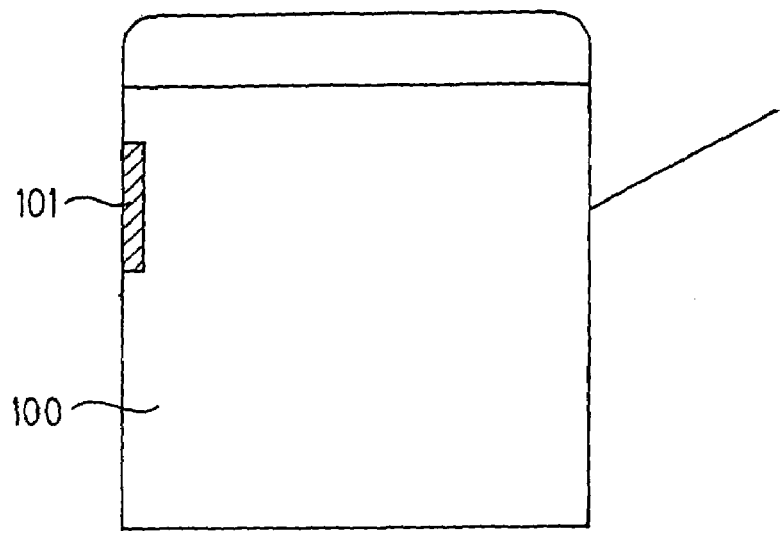
FIG. 3 is a schematic view showing an example in which an ozone-scavenging material of the present invention is fitted in a copying machine.
Figure 4:
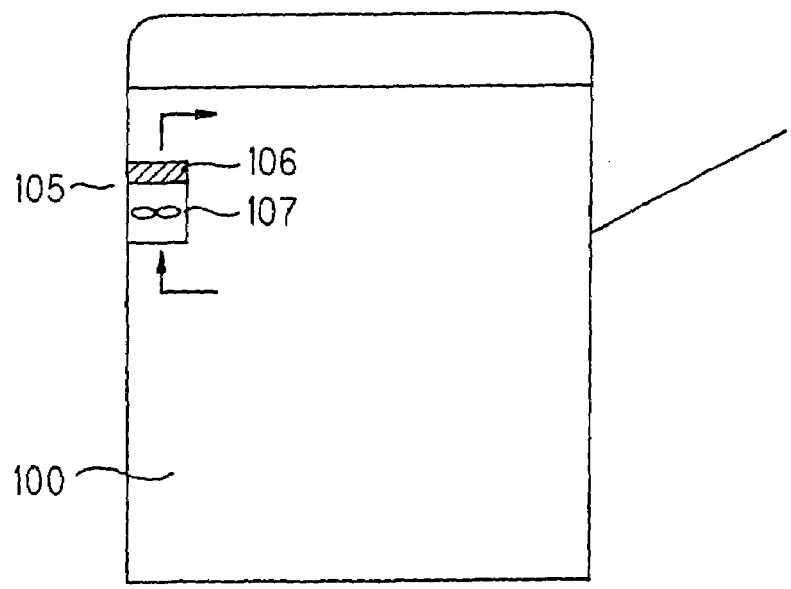
FIG. 4 is a schematic view showing another example in which an ozone-scavenging material of the present invention is fitted in a copying machine.

FIGS. 3 and 4 show examples in which an ozone-scavenging material of the present invention is fitted in a copying machine. Minor amounts of ozone may be generated in copying machines that use a UV lamp or the like in the exposure apparatus. Thus, internally generated ozone can be removed by fitting ozone-scavenging material 101 of the present invention on the wall face or the like of the inside of copying machine 100. In this case, ozone-scavenging material 101 of the present invention may be simply attached to the wall face of the inside of the copying machine as shown in FIG. 3 or a fan-filter unit 105 formed by combining ozone-scavenging material 106 of the present invention with fan 107 may be fitted in copying machine 100 as shown in FIG. 4.

Various embodiments of the present invention are described below. The following description should not be construed to limit the invention.

EXAMPLE 1

Preparation of an Anion Exchange Nonwoven Fabric and Preparation of an Ozone-Scavenging Material A nonwoven fabric having an areal density of 55 g/m$^2$ and a thickness of 0.47 mm made of a polyethylene fiber of about 15 μm in diameter was used as an organic polymer base. This nonwoven fabric base was irradiated with γ-rays at 160 kGy in a nitrogen atmosphere, and then immersed in a glycidyl methacrylate (GMA) solution and reacted at 50° C. for 3 hours. Then, the nonwoven fabric was removed and immersed in dimethyl formamide and washed at 50° C. for 1 hour. Then, the nonwoven fabric was dried and weighed to calculate the grafted degree. A GMA-grafted nonwoven fabric having a grafted degree of 117% was obtained.

This grafted nonwoven fabric was immersed in a 30% aqueous iminodiethanol solution and reacted at 70° C. for 3 hours for amination. A weakly basic anion exchange nonwoven fabric having an ion exchange capacity of 2.81 meq/g was obtained.

A 20 cm square sample cut out from said nonwoven fabric was immersed in a 0.2 mol/l aqueous potassium permanganate solution at room temperature for 10 minutes to adsorb permanganate ion thereto. This sample was washed with 1 liter of pure water three times and then left to dryness in the air. As a result, the color of the nonwoven fabric rapidly changed from the initial dark purple of permanganate ion to brown of manganese oxide.

Ozone-Scavenging Performance Test

Figure 5:
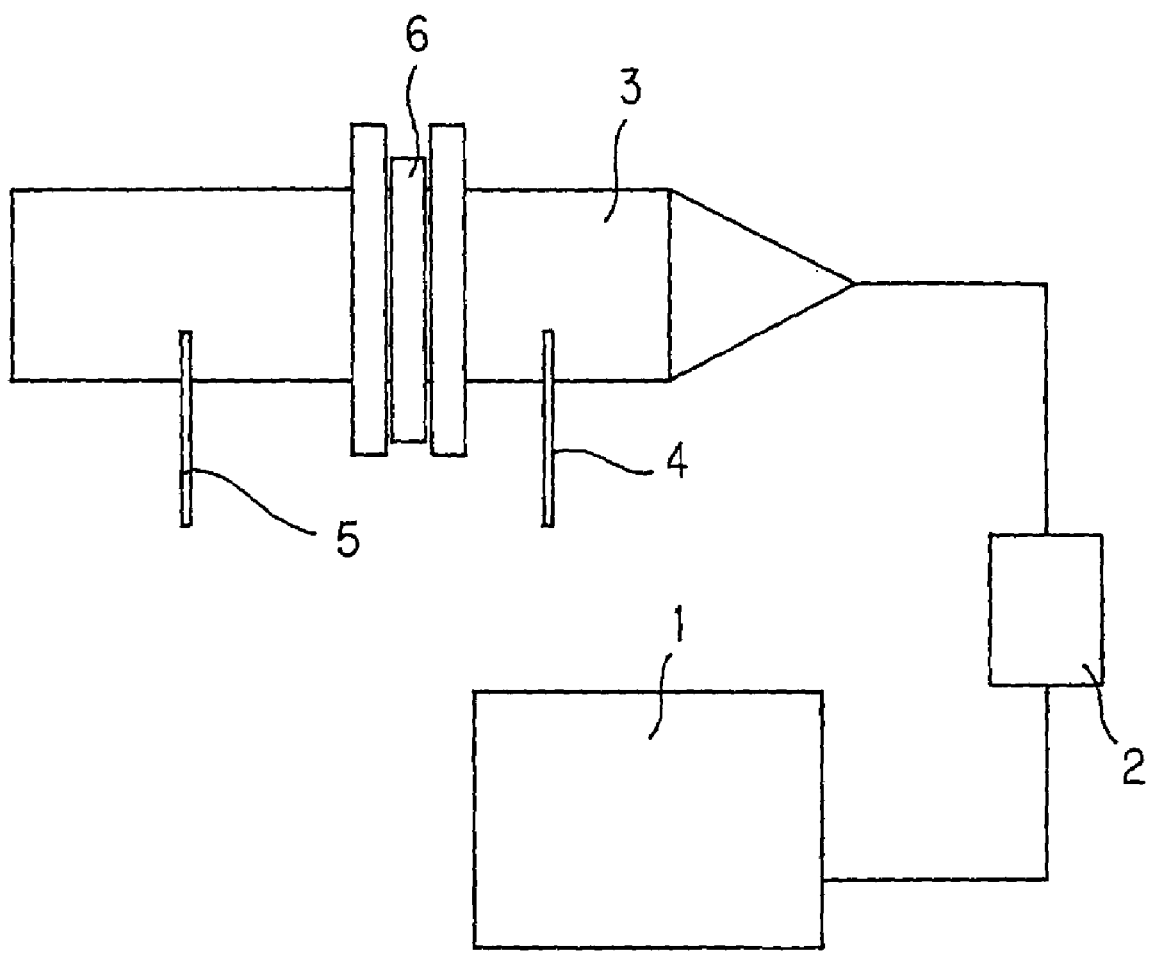
FIG. 5 is a schematic view of the ozone removal tester used in the examples of the present invention.

The ozone removal tester shown in FIG. 5 was used. FIG. 5 shows an ozone generator 1, a flowmeter 2, an ozone-scavenging column 3, an inlet concentration sampling line 4, an outlet concentration sampling line 5, and an ozone-scavenging material 6. A sheet of ozone-scavenging material 6 of the present invention obtained as described above was inserted into ozone-scavenging column 1 shown in FIG. 5 made of acrylic polymer, and fed with air containing 8 ppm ozone at a flow rate of 5 liters/min. After 24 hours, the air at the outlet of the ozone-scavenging material was collected from sampling line 5 and measured for ozone concentration to show that the ozone concentration was stable at 3 ppm with no tendency of lowering scavenging performance.

EXAMPLE 2

Preparation of an Anion Exchange Nonwoven Fabric and Preparation of an Ozone-Scavenging Material A nonwoven fabric base as used in Example 1 was irradiated with γ-rays in the same manner as in Example 1. The irradiated nonwoven fabric was immersed in a mixed monomer solution of vinylbenzyltrimethylammonium chloride (VBTAC) and N,N-dimethyl acrylamide (DMAA) and reacted at 50° C. for 3 hours. The nonwoven fabric was removed and immersed in pure water and washed at 50° C. for 1 hour. Then, the nonwoven fabric was dried and weighed to calculate the grafted degree. A VBTAC/DMAA-grafted nonwoven fabric having a grafted degree of 161% was obtained. The ion exchange capacity of this nonwoven fabric was determined to show that a strongly basic anion exchange nonwoven fabric of 1.23 meq/g was obtained.

A 20 cm square sample cut out from said nonwoven fabric was immersed in a 0.2 mol/l aqueous potassium permanganate solution at room temperature for 10 minutes to adsorb permanganate ion thereto. This sample was washed with 1 liter of pure water three times and then left to dryness in the air. As a result, the color of the nonwoven fabric rapidly changed from the initial dark purple of permanganate ion to brown of manganese oxide.

Ozone-Scavenging Performance Test

The ozone-scavenging material of the present invention obtained as described above was tested with the ozone removal tester shown in FIG. 5 in the same manner as in Example 1. The ozone concentration in the sample gas was stable at 4 ppm at the outlet versus 8 ppm at the inlet of the ozone-scavenging column.

INDUSTRIAL APPLICABILITY

As has been described above, ozone-scavenging materials of the present invention are characterized in that a metal having ozone-decomposing ability or an oxide thereof is supported on an organic polymer base having a polymer side chain having an ion exchange group on the backbone of a polymer, whereby they have high physical strength and can efficiently remove ozone in the air. They can be prepared at lower cost than conventional ozone-scavenging materials such as activated carbon or a metal supported on zeolite, and can be more easily treated after use as compared with conventional forms.

The invention claimed is:

1. An ozone-scavenging material comprising:
   an organic polymer base having a polymer side chain having an ion exchange group on the backbone of the polymer base, and
   an oxide of a metal having ozone-decomposing ability in the form of fine particles supported on the organic polymer base;
   wherein the polymer side-chain has been introduced onto the organic polymer based using radiation-induced graft polymerization, and
   wherein the fine particles of an oxide of said metal have been prepared by a process comprising (i) supporting an ion of said metal or an ion of an oxide of said metal on the ion exchange group, and then (ii) converting the supported ions into the form of a metal oxide by oxidation or reduction.

2. The ozone-scavenging material of claim 1, wherein the organic polymer base is selected from the group consisting of fibers, a fiber assembly of woven or non-woven fabric, and processed products thereof.

3. The ozone-scavenging material of claim 2, wherein the metal having ozone-decomposing ability is selected from the group consisting of manganese, zinc, silver, nickel, cobalt and copper.

4. The ozone-scavenging material of claim 1, wherein the organic polymer base is selected from the group consisting of fibers, a fiber assembly of woven or non-woven fabric, and processed products thereof.

5. The ozone-scavenging material of claim 4, wherein the metal having ozone-decomposing ability is selected from the group consisting of manganese, zinc, silver, nickel, cobalt and copper.

6. The ozone-scavenging material of claim 1, wherein the metal having ozone-decomposing ability is selected from the group consisting of manganese, zinc, silver, nickel, cobalt and copper.

7. The ozone-scavenging material of claim 1, wherein the metal having ozone-decomposing ability is selected from the group consisting of manganese, zinc, silver, nickel, cobalt and copper.

8. A process for preparing the ozone-scavenging material of claim 1, comprising:
    introducing a polymer side chain having an ion exchange group onto the backbone of an organic polymer base,
    bringing the resulting organic polymer material into contact with a salt of a metal having ozone-decomposing ability to support the ion of said metal on the ion exchange group, and then
    precipitating fine particles of said metal or an oxide of said metal on the organic polymer material by oxidation or reduction.

9. The process of claim 8, wherein the polymer side chain has been introduced onto the organic polymer base using radiation-induced graft polymerization.

10. The process of claim 9, wherein the organic polymer base is selected from the group consisting of fibers, a fiber assembly of woven or non-woven fabric, and processed products thereof.

11. The process of claim 10, wherein the metal having ozone-decomposing ability is selected from the group consisting of manganese, zinc, silver, nickel, cobalt and copper.

12. The process of claim 8, wherein the metal having ozone-decomposing ability is selected from the group consisting of manganese, zinc, silver, nickel, cobalt and copper.

13. The process of claim 8, wherein the organic polymer base is selected from the group consisting of fibers, a fiber assembly of woven or non-woven fabric, and processed products thereof.

14. The process of claim 13, wherein the metal having ozone-decomposing ability is selected from the group consisting of manganese, zinc, silver, nickel, cobalt and copper.

15. The process of claim 9, wherein the metal having ozone-decomposing ability is selected from the group consisting of manganese, zinc, silver, nickel, cobalt and copper.

16. An ozone-scavenging apparatus comprising the ozone-scavenging material of claim 1.

17. A filter unit comprising the ozone-scavenging material of claim 1.

* * * * *